(12) United States Patent
Baxter

(10) Patent No.: US 11,873,744 B2
(45) Date of Patent: Jan. 16, 2024

(54) THREAD LOCKING MECHANISM

(71) Applicant: Baxter Performance, Spokane, WA (US)

(72) Inventor: Kevin Baxter, Spokane, WA (US)

(73) Assignee: Baxter Performance, Spokane, WA (US)

( * ) Notice: Subject to any disclaimer, the term of this patent is extended or adjusted under 35 U.S.C. 154(b) by 566 days.

(21) Appl. No.: 16/999,864

(22) Filed: Aug. 21, 2020

(65) Prior Publication Data

US 2021/0054770 A1     Feb. 25, 2021

Related U.S. Application Data

(60) Provisional application No. 62/890,509, filed on Aug. 22, 2019.

(51) Int. Cl.

| | |
|---|---|
| *F01M 11/03* | (2006.01) |
| *B01D 35/00* | (2006.01) |
| *B01D 35/02* | (2006.01) |
| *F16B 5/02* | (2006.01) |
| *B01D 35/30* | (2006.01) |

(52) U.S. Cl.
CPC ........... *F01M 11/03* (2013.01); *B01D 35/005* (2013.01); *B01D 35/02* (2013.01); *B01D 35/306* (2013.01); *F16B 5/02* (2013.01); *B01D 2201/4076* (2013.01); *B01D 2201/4092* (2013.01); *F01M 2011/031* (2013.01)

(58) Field of Classification Search
CPC .............. F01M 11/03; F01M 2011/031; B01D 35/005; B01D 35/02; B01D 35/306; B01D 2201/4076; B01D 2201/4092; B01D 27/08; F16B 5/02; F16B 39/028
See application file for complete search history.

(56) References Cited

U.S. PATENT DOCUMENTS

| | | | |
|---|---|---|---|
| 3,540,594 A | 11/1970 | Sanderson | |
| 4,247,082 A * | 1/1981 | Sjolund | B66F 3/30 |
| | | | 92/136 |
| 7,524,416 B1 | 4/2009 | Bergmen | |
| 2017/0361253 A1* | 12/2017 | Baxter | F01M 11/03 |

OTHER PUBLICATIONS

PCT Search Report and Written Opinion dated Nov. 20, 2020 for PCT Application No. PCT/US20/47454, 8 pages.
Interantional Preliminary Report on Patentability for PCT App No. PCT/US20/47454, dated Mar. 3, 2022, 7 pages.

* cited by examiner

*Primary Examiner* — Waqaas Ali
(74) *Attorney, Agent, or Firm* — Lee & Hayes, P.C.

(57) ABSTRACT

A thread locking mechanism may be include in a threaded portion of a removable part to enable the removable part to be securely locked to an assembly such that the removable part does not turn when another part is being attached or removed. The thread locking mechanism may also be unlocked when it is desirable for the removable part to turn and be removed from, or further secured to, the assembly. In some examples the removable part may be an oil filter adapter, the assembly may include an engine, and the other part may be an oil filter.

16 Claims, 8 Drawing Sheets

THREAD LOCKING MECHANISM

RELATED APPLICATIONS

This application claims the benefit of U.S. Provisional Patent Application Ser. No. 62/890,509, filed on Aug. 22, 2019, titled "THREAD LOCKING MECHANISM," the entirety of which is incorporated herein by reference.

BACKGROUND

Threaded surfaces are used in a variety of applications, such as piping, vehicles, and machinery, to secure parts of an assembly together. In some cases, multiple parts of an assembly may be secured together via threading on each part. Due to varying degrees of torque applied to each individual part when it was installed, as well as the different specifications of each part (e.g., distance between threads, size of threads, etc.), it may be difficult to turn an individual part of the assembly without also turning, and thereby un-installing, the other part or parts that the individual part is attached too. Thus, there is a need for a thread locking mechanism that can secure a first end of a part of an assembly such that when another part is being installed or un-installed on a second end of the part of the assembly, the part does not turn.

BRIEF DESCRIPTION OF THE DRAWINGS

The detailed description is set forth with reference to the accompanying figures. The use of the same reference numbers in different figures indicates similar or identical items.

DETAILED DESCRIPTION

Overview

Figure 1A:
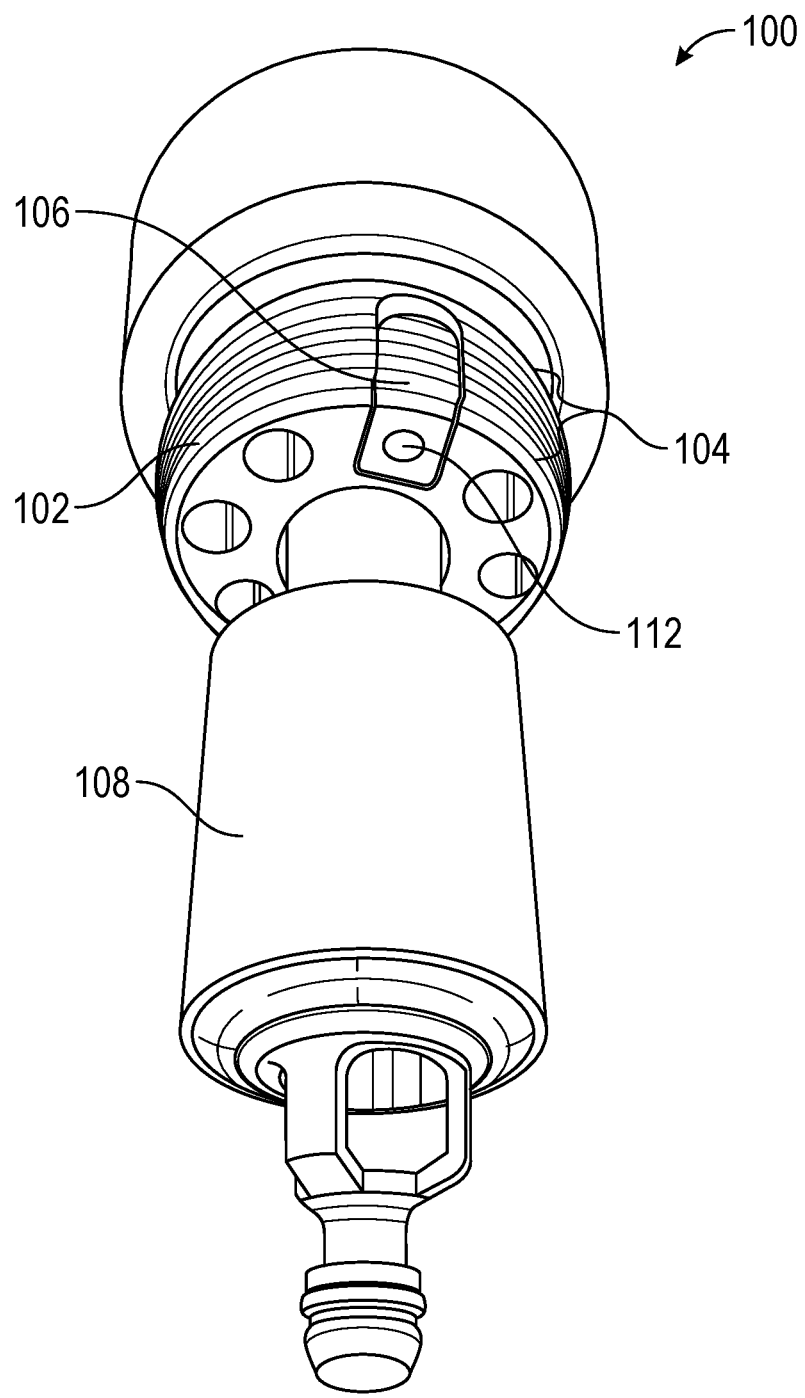
FIG. 1A illustrates a perspective view of an example oil filter adapter having an adjustable portion viewed from below.
Figure 1B:
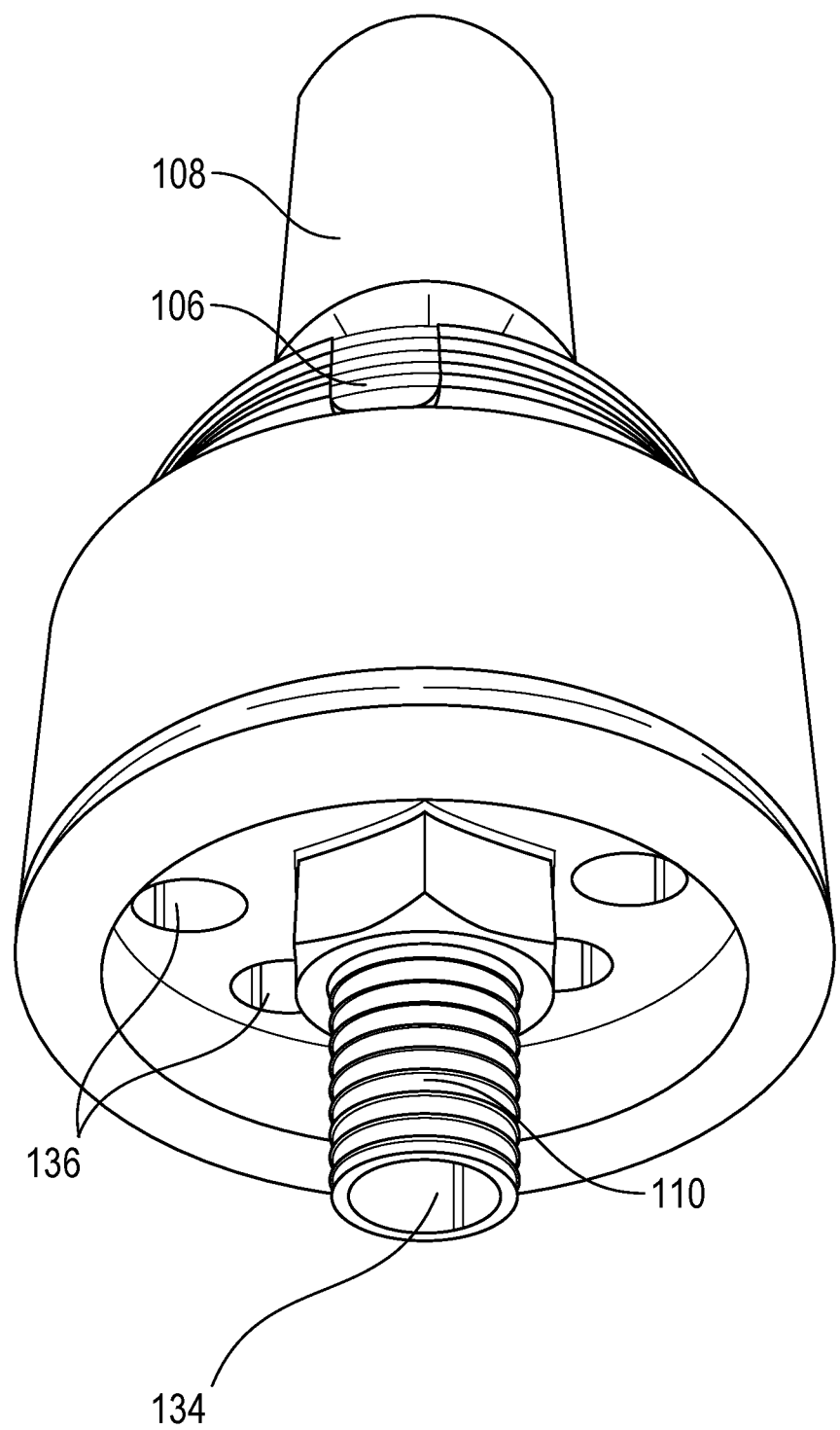
FIG. 1B illustrates a perspective view of an example oil filter adapter having an adjustable portion viewed from above.
Figure 1C:
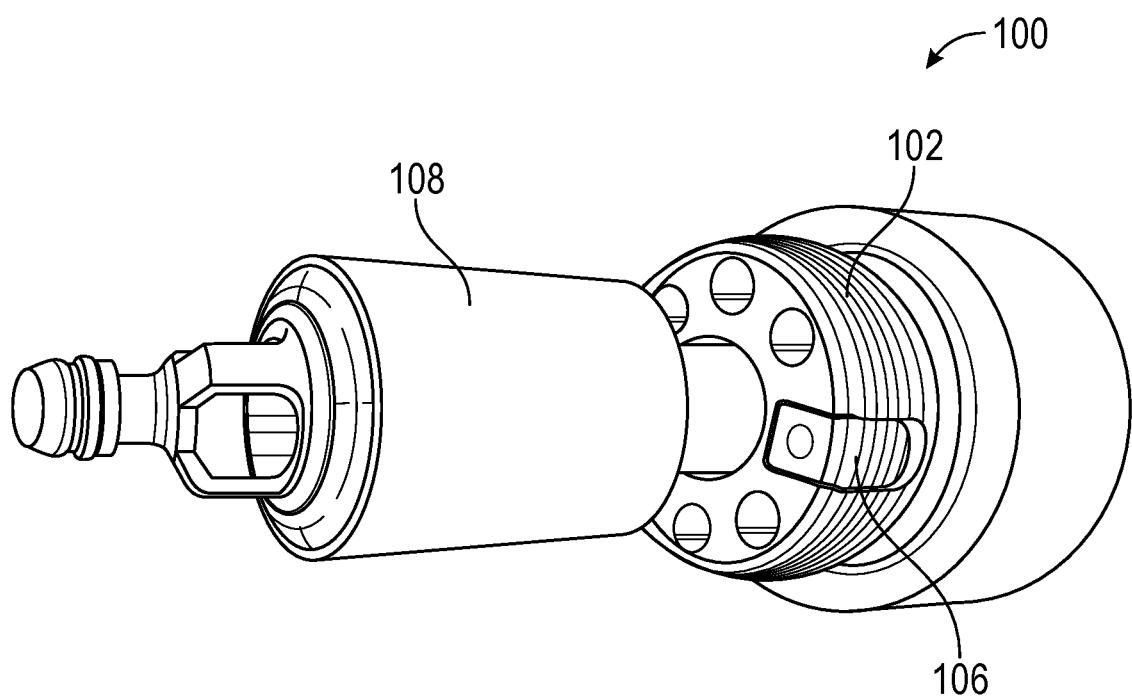
FIG. 1C illustrates a perspective view of an example oil filter adapter having an adjustable portion viewed from the side.
Figure 1D:
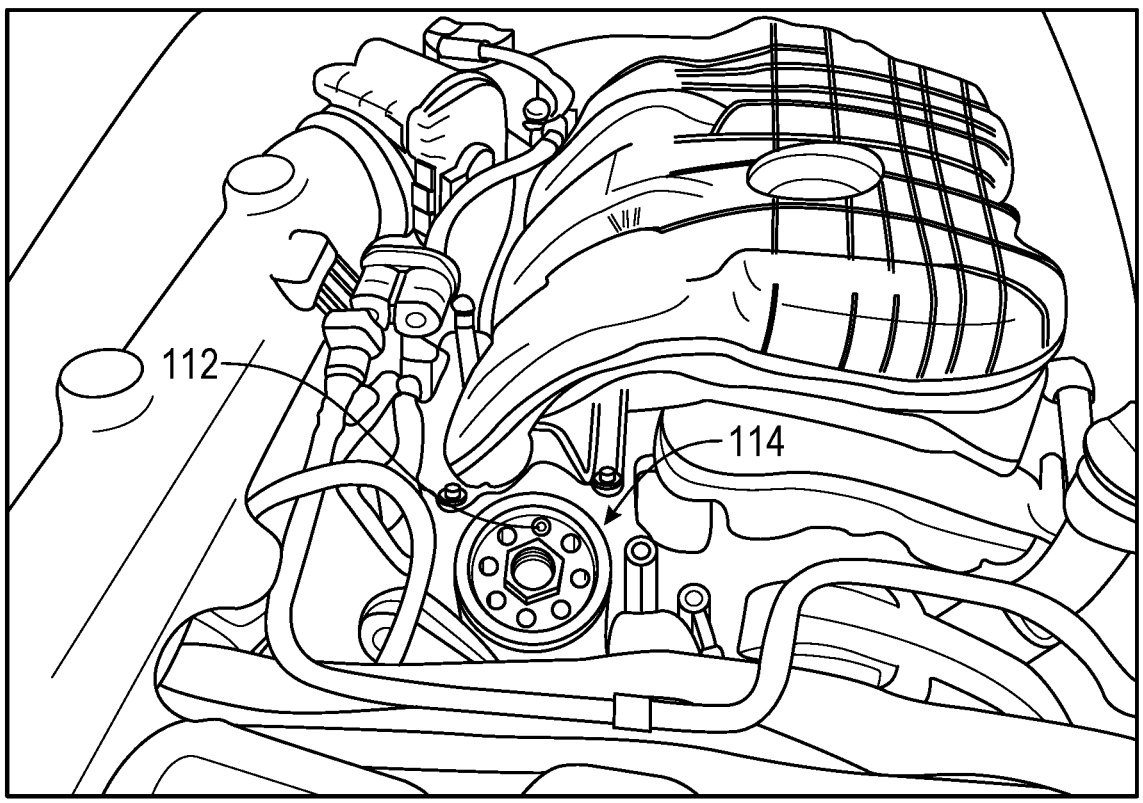
FIG. 1D illustrates a perspective view of an example oil filter adapter having an adjustable portion coupled with an engine viewed from above.
Figure 1E:
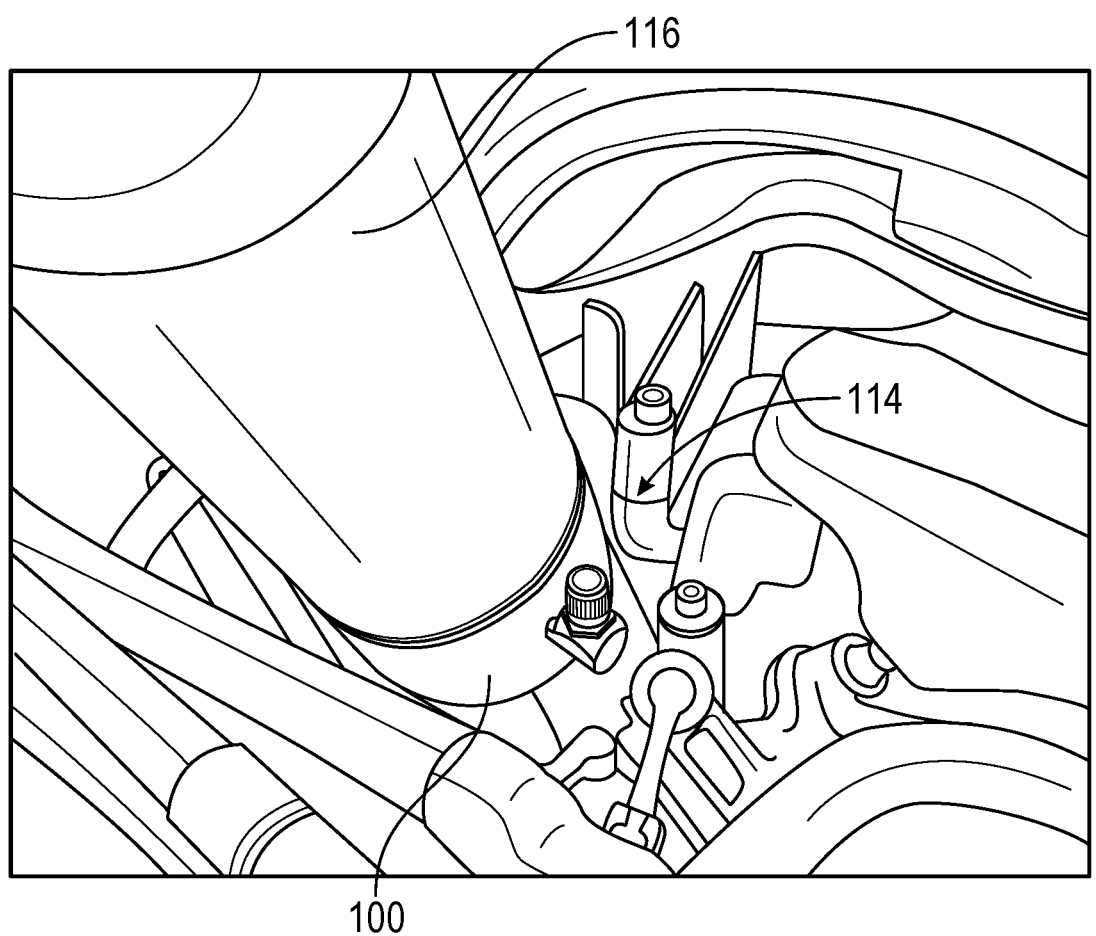
FIG. 1E illustrates a perspective view of an example oil filter adapter having an adjustable portion coupled with an engine and an oil filter viewed from above.

As discussed above, mechanical assemblies that are made of multiple parts may often be held together via a number of threaded ends on each individual part. When adjusting (e.g., turning) one of the parts, it may be critical that the adjoining parts do not also turn, thereby loosening or tightening their connection to a different part. Existing locking mechanisms are often permanent and inaccessible once the parts are connected together. In many cases, such as the case in a vehicle engine, it may be desirable to disassemble parts of an assembly for routine maintenance.

This application describes a thread locking mechanism included in a threaded portion of a removable part to enable the removable part to be securely locked to an assembly such that the removable part does not turn when another part is being attached or removed. The thread locking mechanism may also be un-locked when it is desirable for the removable part to turn and be removed from, or further secured to, the assembly. In some cases, the removable part may be an oil filter adapter that can be used in an engine to enable an oil filter system that is designed for using cartridge oil filters to use spin-on oil filters. The oil filter adapter may be configured to attach to an oil filter housing of a vehicle, form a seal with the oil filter housing, and have an attachment for a spin-on oil filter. The oil filter adapter may have a first end that attaches to an oil filter housing and a second end that attaches to a spin-on oil filter. When the oil filter adapter is attached to the oil filter housing, threads on an exterior of the oil filter adapter may make contact with threads that are on an interior of the oil filter housing. As the oil filter adapter is coupled with the oil filter housing and turned clockwise, the oil filter adapter may recede into the oil filter housing and the exterior threads of the oil filter adapter may interlace with the interior threads of the oil filter housing as the oil filter adapter and the oil filter housing tighten together and are coupled. Once the oil filter adapter is coupled with the oil filter housing, the thread locking mechanism may be adjusted such that the oil filter adapter is unable to further spin clockwise or counter clockwise, thereby uninstalling itself from the oil filter housing. For example, the thread locking mechanism may be an adjustable portion of the first end of the oil filter that attaches to an oil filter housing. The adjustable portion may be adjustable via a screw that extends from the second end of the oil filter into the adjustable portion located in the first end of the oil filter that attaches to an oil filter housing, with a head of the screw being accessible via the second end of the oil filter when the oil filter is coupled with the oil filter housing. The adjustable portion may be coupled with the screw via threads located on an interior of the adjustable portion such that, when the screw is turned clockwise, the adjustable portion moves closer to the screw head, and when the screw is turned counter clockwise, the adjustable portion moves away from the screw head. The adjustable portion may also include threads on an exterior portion of the adjustable portion such that, when the adjustable portion is properly aligned, the threads on an exterior portion of the adjustable portion line up with the exterior threads of the oil filter adapter. When the threads on the exterior portion of the adjustable portion and the exterior threads of the oil filter adapter are aligned, the oil filter adapter may freely be installed or un-installed with the oil filter housing (i.e., may turn freely). Once the oil filter adapter is coupled with the oil filter housing, and it is desirable to secure the oil filter adapter to the oil filter housing (e.g., an oil filter is needed to be installed or un-installed from the oil filter adapter), the screw head may be turned clock wise causing the adjustable portion of the oil filter adapter to move closer to the screw head. When the oil filter adapter is coupled with the oil filter housing and the adjustable portion of the oil filter adapter moves closer to the screw head, the threads located on the exterior portion of the adjustable portion become misaligned with the threads located on the exterior portion of the oil filter adapter, which causes a tension on the threads located on the interior portion of the oil filter housing. This tension locks the oil filter adapter in place such that any torque on the oil filter adapter, e.g., adding or removing oil filters from the second end of the oil filter adapter, does not cause the oil filter adapter to move.

Additionally, once the oil filter adapter is locked into place, the screw may be turned counter clockwise, thereby moving the adjustable portion away from the screw head and aligning the threads on the exterior portion of the adjustable portion with the exterior threads of the oil filter adapter. When the threads on the exterior portion of the adjustable portion and the exterior threads of the oil filter adapter are aligned, the oil filter adapter may freely be un-installed with the oil filter housing (i.e., may turn freely) and may be removably detached from the oil filter housing.

Although the example provided above in which the thread locking mechanism may be used pertains to an oil filter adapter, any surface that includes an exterior threaded portion and/or an interior threaded portion may utilize the thread locking mechanism to lock the part into position and prevent the part from turning. For example, a cylindrical component with a first end having an exterior threaded portion and/or an interior threaded portion may include a first threaded end including an adjustable portion and a second end. The adjustable portion may include a threaded exterior portion and/or a threaded interior portion such that when the adjustable portion is properly aligned, the threads of the adjustable portion align with the threads of the cylindrical mechanism. The adjustable portion may be coupled with a screw that extends along a length of the cylindrical component such that a head of the screw is accessible via the second end. In some examples, the screw may be located within an interior of a wall of the cylindrical device. When the screw is turned, i.e., clockwise or counter clockwise, the adjustable portion may move along an axis that runs parallel with a length of the cylindrical mechanism, thereby causing the threads of the adjustable portion to become aligned or misaligned with the threads of the cylindrical mechanism. When the threads of the adjustable portion are aligned with the threads of the cylindrical mechanism, the cylindrical component may freely spin to attach to another threaded part. Once the cylindrical component and the threaded part are attached to one another, the screw may be turned (i.e., accessed via the second end of the cylindrical mechanism) in a clockwise or counter clockwise direction causing the threads of the adjustable portion to be misaligned with the threads of the cylindrical mechanism. When the cylindrical component is coupled with the threaded part and the threads of the adjustable portion become misaligned with the threads of the cylindrical mechanism, a tension is applied to the threads located on the threaded part. This tension locks the cylindrical component in place such that any torque on the cylindrical mechanism, e.g., adding or removing parts from the second end of the cylindrical mechanism, does not cause the cylindrical component to move.

Additionally, once the cylindrical component is locked into place, the screw may be turned clockwise or counter clockwise, thereby moving the adjustable portion and aligning the threads on the adjustable portion with the threads of the cylindrical mechanism. When the threads on the adjustable portion and the threads of the cylindrical component are aligned, the cylindrical component may freely be unattached from the threaded part (i.e., may turn freely) and may be removably detached from the threaded part.

Additionally, the threads included on the adjustable portion and/or the threads included on the cylindrical mechanism (or, in some cases, the oil filter adapter) may vary in type depending on different embodiments. For example, the threads may be left-handed, right-handed, include different forms (i.e., cross-sectional shape such as square, triangular, trapezoidal, etc.), include different thread angles (e.g., 50 degrees, 60 degrees, 70 degrees, etc.), include different pitch (i.e., distance from the crest of one thread to the next, such as a course pitch or a fine pitch), include different diameters, and/or include different thread depths. Additionally, the threads may be associated with any existing standards, such as the International Organization for Standardization (ISO) metric screw threads, the Unified Thread Standard (UTS), Unified Coarse (UNC), Unified Fine (UNF), Unified Extra Fine (UNEF), Unified Special (UNS), National pipe thread (NPT), British Standard Whitworth (BSW), British standard pipe thread (BSP), and the like.

Example Thread Locking Mechanism

Turning now to the figures, details are provided concerning various example embodiments. In general, the embodiments disclosed in the figures are presented by way of example. The components disclosed in the figures may be combined as desired to create a removable part with a thread locking mechanism having various configurations. The components disclosed in the figures may be rearranged, modified, duplicated, and/or omitted in some configurations.

With reference to FIG. 1A-1E, an example embodiment of an oil filter adapter 100 is illustrated that includes a base 102, threads 104 used to couple with an engine, and an adjustable portion 106, a docking collar 108, an oil filter attachment 110, and a screw 112. The oil filter adapter 100 allows for adjustment of orientation, distance, or alignment of an oil filter to an engine. In some examples, threads 104 may attach to an oil filter housing 114 that is attached to an engine. For example, the oil filter adapter 100 may be configured to attach to an oil filter housing 114 of a vehicle and form a seal with the oil filter housing 114. The oil filter adapter 100 may have a first end that attaches to an oil filter housing 114 and a second end that attaches to a spin-on oil filter, such as spin-on oil filter 116. When the oil filter adapter 100 is attached to the oil filter housing 114, threads 104 on an exterior of the oil filter adapter 100 may make contact with threads that are on an interior of the oil filter housing 114. As the oil filter adapter 100 is coupled with the oil filter housing 114 and turned clockwise, the oil filter adapter 100 may recede into the oil filter housing 114 and the exterior threads 104 of the oil filter adapter 100 may interlace with the interior threads of the oil filter housing 114 as the oil filter adapter 100 and the oil filter housing 114 tighten together and are coupled. Once the oil filter adapter 100 is coupled with the oil filter housing 114, the thread locking mechanism may be adjusted such that the oil filter adapter 100 is unable to further spin clockwise or counter clockwise, thereby uninstalling itself from the oil filter housing 114. For example, the thread locking mechanism may include the adjustable portion 106 of the first end of the oil filter adapter 100 that attaches to the oil filter housing 114. The adjustable portion 106 may be adjustable via a screw 112 that extends from the second end of the oil filter adapter 100 into the adjustable portion 106 located in the first end of the oil filter adapter 100 that attaches to an oil filter housing 114, with a head of the screw 112 being accessible via the second end of the oil filter adapter 100 when the oil filter adapter 100 is coupled with the oil filter housing 114. The adjustable portion 106 may be coupled with the screw 112 via threads located on an interior of the adjustable portion 106 such that, when the screw 112 is turned clockwise, the adjustable portion 106 moves closer to the screw 112 head, and when the screw 112 is turned counter clockwise, the adjustable portion 106 moves away from the screw 112 head. That is, the adjustable portion 106 may be axially movable with respect to the base 102 (i.e., in a direction substantially parallel with a rotational axis of the oil filter adapter). The adjustable portion 106 may also include threads on an exterior portion of the adjustable portion 106 such that, when the adjustable portion 106 is properly aligned, the threads on the exterior portion of the adjustable portion 106 line up with (e.g., are substantially flush with) the exterior threads 104 of the oil filter adapter 100. When the threads on the exterior portion of the adjustable portion 106 and the exterior threads 104 of the oil filter adapter 100 are aligned, the oil filter adapter 100 may freely be installed or un-installed with the oil filter housing 114 (i.e., may turn freely). Once the oil filter adapter 100 is coupled with the oil filter housing 114, and it is desirable to secure the oil filter adapter 100 to the oil filter housing 114 (e.g., an oil filter is needed to be installed or un-installed from the oil filter adapter), the screw 112 head may be turned clockwise causing the adjustable portion 106 of the oil filter adapter 100 to move closer to the screw 112 head. When the oil filter adapter 100 is coupled with the oil filter housing 114 and the adjustable portion 106 of the oil filter adapter 100 moves closer to the screw 112 head, the threads located on the exterior portion of the adjustable portion 106 become misaligned with the threads 104 located on the exterior portion of the oil filter adapter 100, which causes a tension (i.e., interference) between the threads of the adjustable portion 106 and the threads located on the interior portion of the oil filter housing 114. This tension increases friction between the threads of the adjustable portion 106 and the threads of the oil filter housing 114, thereby locking the oil filter adapter 100 in place such that torque on the oil filter adapter, e.g., adding or removing oil filters from the second end of the oil filter adapter, does not cause the oil filter adapter 100 to rotate.

In some cases, the oil filter adapter 100 includes a number of passages for transporting oil between an oil filter and the oil filter housing 114. For example, the base 102 may include a plurality of passages 136 and 138 used for transporting unfiltered oil from an engine to an oil filter. The base may also include a passage 134 for transporting filtered oil from the oil filter back to the oil filter housing 114.

Additionally, once the oil filter adapter 100 is locked into place, the screw 112 may be turned counter clockwise, thereby moving the adjustable portion 106 away from the screw 112 head and aligning the threads on the exterior portion of the adjustable portion 106 with the exterior threads 104 of the oil filter adapter. When the threads on the exterior portion of the adjustable portion 106 and the exterior threads 104 of the oil filter adapter 100 are aligned, the oil filter adapter 100 may freely be un-installed from the oil filter housing 114 (i.e., may turn freely relative to the oil filter housing 114) and may be removably detached from the oil filter housing 114. Although the figures illustrate the threads 104 of the base 102 and the threads of the adjustable portion 106 being on an exterior of the oil filter adapter 100 (i.e., in a male position), the threads 104 of the base 102 and the threads of the adjustable portion 106 may also be located on an interior of the oil filter adapter 100 (i.e., in a female position).

Figure 1G:
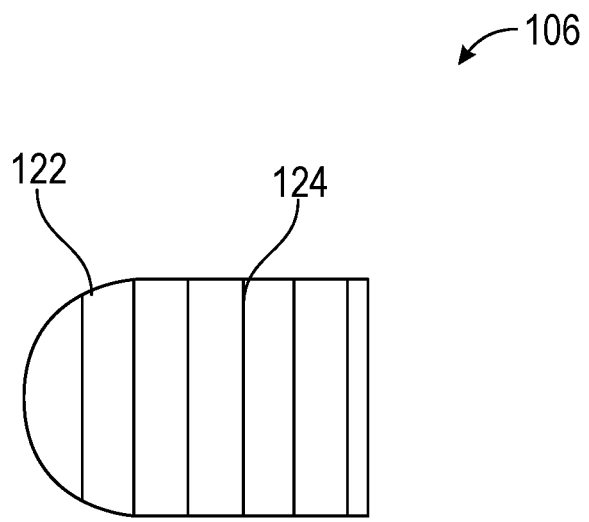
FIGS. 1F-1H are schematic views showing an example adjustable portion usable with, for example, an oil filter adapter and shown from a front, top, and side, respectively.
Figure 1F:
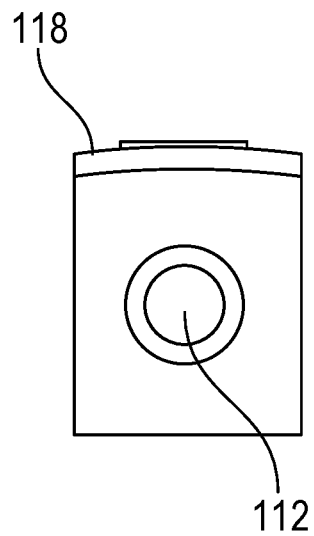
Figure 1H:
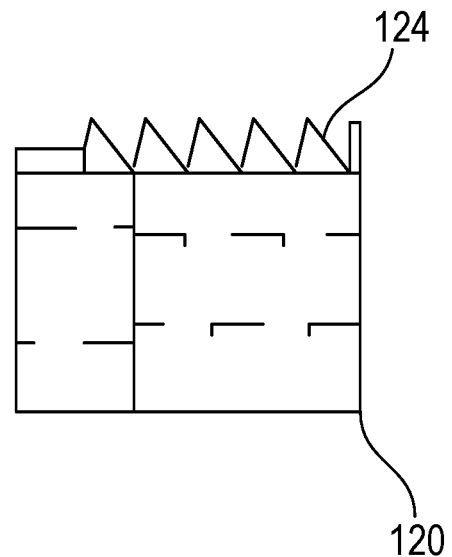

One embodiment of the oil filter adapter 100 is illustrated in greater detail in FIGS. 1F-1M. FIGS. 1F-1H illustrate the adjustable portion 106 viewed from a top view 118, a side view 120, and a front view 122. As discussed above, the adjustable portion 106 may be coupled with the screw 112 via threads located on an interior of the adjustable portion 106 such that, when the screw 112 is turned clockwise, the adjustable portion 106 moves closer to the screw 112 head, and when the screw 112 is turned counter clockwise, the adjustable portion 106 moves away from the screw 112 head. Additionally, the adjustable portion 106 may also include threads 124 on an exterior portion of the adjustable portion 106 such that, when the adjustable portion 106 is properly aligned, the threads 124 on the exterior portion of the adjustable portion 106 line up with the exterior threads 104 of the oil filter adapter 100. When the threads 124 on the exterior portion of the adjustable portion 106 and the exterior threads 104 of the oil filter adapter 100 are aligned, the oil filter adapter 100 may freely be installed or un-installed with the oil filter housing 114 (i.e., may turn freely).

Figure 1I:
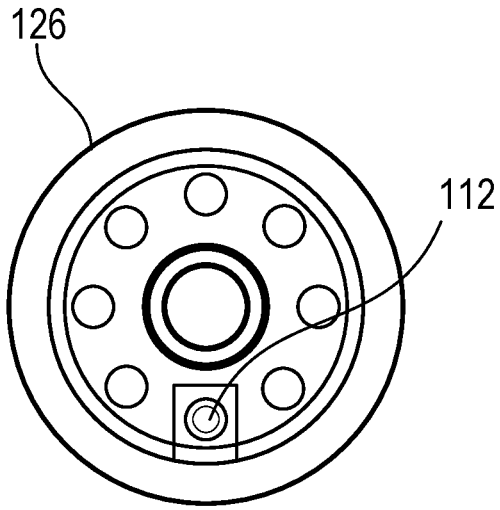
FIGS. 1I-1K are a schematic views showing an example base of an oil filter adapter.
Figure 1J:
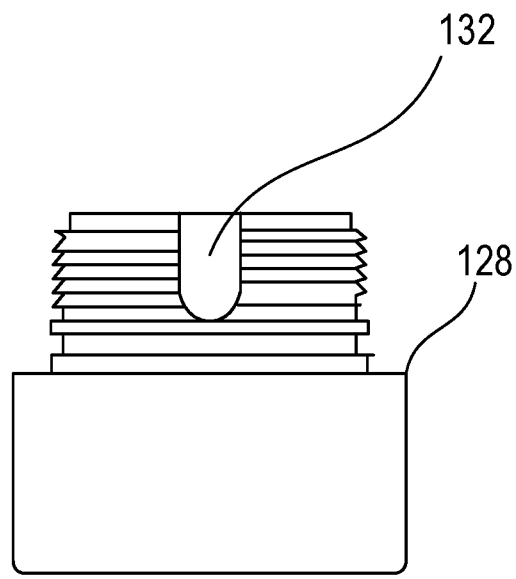
Figure 1K:
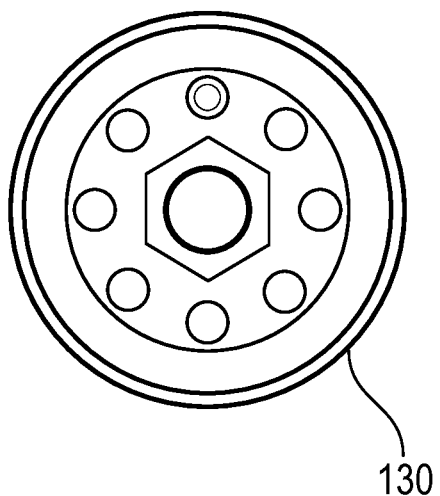

FIGS. 1I-1K illustrate the base 102 of the oil filter adapter 100 viewed from a top view 126, a side view 128, and a bottom view 130. As discussed above, the base 102, may include the screw 112 that extends from the second end of the base 102 into a space 132 that is configured to receive the adjustable portion 106, with a head of the screw 112 being accessible via the second end of the base 102 when the oil filter adapter 100 is coupled with the oil filter housing 114.

Figure 1L:
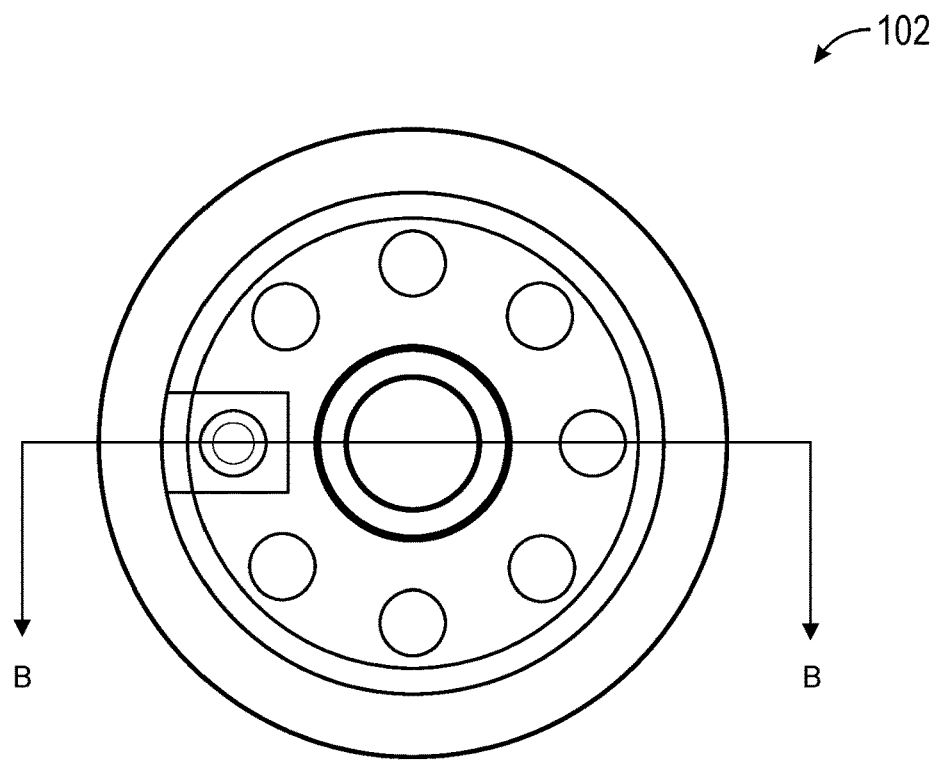
FIG. 1L illustrates a top view of a base of an example oil filter adapter.
Figure 1M:
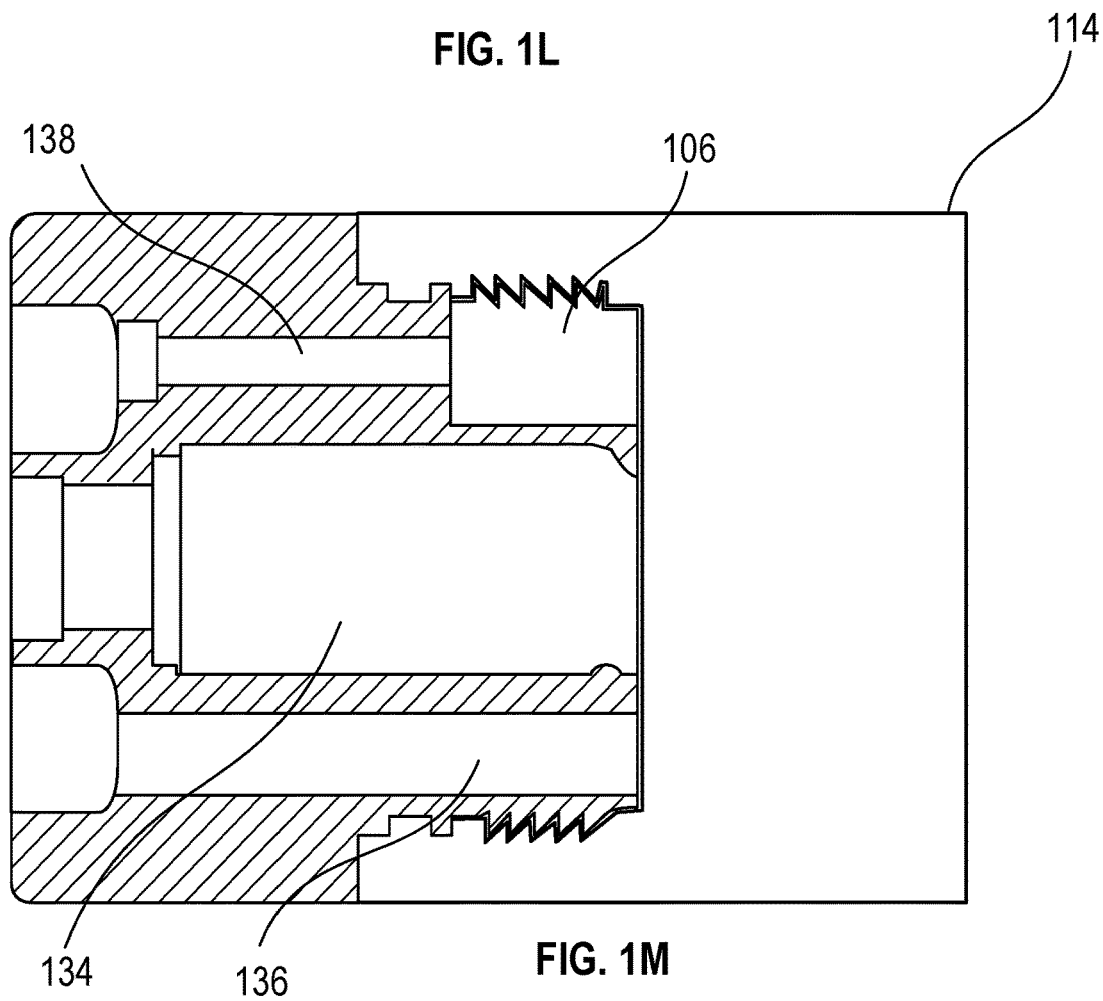
FIG. 1M illustrates a cross section of the base of the example oil filter adapter of FIG. 1L taken along line B-B in FIG. 1L.

FIG. 1M illustrates a side cross-sectional view of base 102 taken along a line B-B from FIG. 1L. FIG. 1M includes the adjustable portion 106 as well as passages 134-138 used to transport fluid (e.g., oil) between the spin-on oil filter 116 and the oil filter housing 114.

CONCLUSION

Although the disclosure describes embodiments having specific structural features and/or methodological acts, it is to be understood that the claims are not necessarily limited to the specific features or acts described. Rather, the specific features and acts are merely illustrative of some embodiments that fall within the scope of claims of the application.

What is claimed is:
1. An oil filter adapter comprising:
   a cylindrical base having a first end having a threaded portion for coupling to an engine and a second end for coupling to an oil filter, the cylindrical base having an unfiltered oil passage and a filtered oil passage;
   a locking mechanism movably coupled to the first end such that a threaded portion of the locking mechanism is flush with the threaded portion of the first end of the cylindrical base, the locking mechanism being axially movable with respect to the cylindrical base; and
   a screw inserted through the second end and coupled with the locking mechanism, a head of the screw being accessible via the second end.
2. The oil filter adapter of claim 1, wherein the screw and the locking mechanism are coupled such that, in response to the screw turning clockwise, the locking mechanism moves toward the head of the screw.
3. The oil filter adapter of claim 2, wherein in response to the locking mechanism moving toward the head of the screw, the threaded portion of the locking mechanism is misaligned with the threaded portion of the first end.
4. The oil filter adapter of claim 1, wherein the screw and the locking mechanism are coupled such that, in response to the screw turning counter clockwise, the locking mechanism moves away from the head of the screw.
5. The oil filter adapter of claim 4, wherein in response to the locking mechanism moving away from the head of the screw, the threaded portion of the locking mechanism is misaligned with the threaded portion of the first end.

6. The oil filter adapter of claim 1, wherein the head of the screw is accessible via the second end while the first end of the cylindrical base is coupled to the engine.

7. The oil filter adapter of claim 1, wherein the threaded portion is a female threaded portion with threads on an internal surface of the cylindrical base.

8. The oil filter adapter of claim 1, wherein the threaded portion is a male threaded portion with threads on an exterior of the cylindrical base.

9. A system comprising:
   a cylindrical component comprising a threaded portion;
   a locking mechanism movably coupled to a first end of the cylindrical component such that a threaded portion of the locking mechanism is flush with the threaded portion of the first end of the cylindrical component, the locking mechanism comprising an adjustable portion that is axially movable with respect to the cylindrical component; and
   a screw inserted through a second end of the cylindrical component and coupled with the locking mechanism, a head of the screw being accessible via the second end, wherein the screw and the locking mechanism are coupled such that:
      in response to the screw turning clockwise, the locking mechanism moves toward the head of the screw; and
      in response to the screw turning counter clockwise, the locking mechanism moves away from the head of the screw.

10. The system of claim 9, wherein the threaded portion of the first end of the cylindrical component is a male threaded portion with threads on an exterior of the cylindrical component.

11. The system of claim 9, wherein in response to the locking mechanism moving toward the head of the screw, a threaded exterior of the locking mechanism is misaligned with a threaded exterior of the first end.

12. The system of claim 9, wherein in response to the locking mechanism moving away from the head of the screw, a threaded exterior of the locking mechanism is misaligned with a threaded exterior of the first end.

13. A system comprising:
   a cylindrical component comprising a threaded portion;
   a locking mechanism movably coupled to a first end of the cylindrical component such that a threaded portion of the locking mechanism is substantially flush with the threaded portion of the first end of the cylindrical component, the locking mechanism comprising an adjustable portion that is being axially movable with respect to the cylindrical component; and
   a screw inserted through a second end of the cylindrical component and coupled with the locking mechanism, a head of the screw being accessible via the second end, wherein the screw and the locking mechanism are coupled such that:
      in response to the screw turning clockwise, the locking mechanism moves away from the head of the screw; and
      in response to the screw turning counter clockwise, the locking mechanism moves toward the head of the screw.

14. The system of claim 13, wherein the threaded portion of the first end of the cylindrical component is a male threaded portion with threads on an exterior of the cylindrical component.

15. The system of claim 13, wherein in response to the locking mechanism moving toward the head of the screw, a threaded exterior of the locking mechanism is misaligned with a threaded exterior of the first end.

16. The system of claim 13, wherein in response to the locking mechanism moving away from the head of the screw, a threaded exterior of the locking mechanism is misaligned with a threaded exterior of the first end.

* * * * *